United States Patent
Nelson

(10) Patent No.: US 6,547,225 B1
(45) Date of Patent: Apr. 15, 2003

(54) PNEUMATIC ISOLATOR WITH BAROMETRIC INSENSITIVITY

(75) Inventor: Peter G. Nelson, Newburyport, MA (US)

(73) Assignee: Technical Manufacturing Corporation, Peabody, MA (US)

( * ) Notice: Subject to any disclaimer, the term of this patent is extended or adjusted under 35 U.S.C. 154(b) by 0 days.

(21) Appl. No.: 09/836,775

(22) Filed: Apr. 17, 2001

(51) Int. Cl.[7] ............................................. F16F 9/04
(52) U.S. Cl. ..................... 267/64.27; 267/64.28; 248/631
(58) Field of Search ....................... 267/64.27, 64.28; 248/631

(56) References Cited

U.S. PATENT DOCUMENTS

| | | | |
|---|---|---|---|
| 3,598,353 A | 8/1971 | DeGrey | 248/358 |
| 3,627,246 A | 12/1971 | Widding et al. | 248/188.8 |
| 3,784,146 A | 1/1974 | Matthews | 248/358 |
| 3,836,134 A * | 9/1974 | Lowe et al. | 267/152 |
| 3,917,201 A | 11/1975 | Roll | 248/20 |
| 4,325,249 A * | 4/1982 | Berglund | 73/37.6 |
| 4,360,184 A * | 11/1982 | Reid, III | 248/573 |
| 4,496,130 A | 1/1985 | Toyama | 248/585 |
| 4,941,640 A | 7/1990 | Nakamura et al. | 248/562 |
| 5,026,010 A | 6/1991 | Camarota | 248/188.1 |
| 5,042,784 A | 8/1991 | Murai et al. | 267/136 |
| 5,067,684 A | 11/1991 | Garnjost | 248/550 |
| 5,071,108 A * | 12/1991 | Houghton, Jr. | 267/136 |
| 5,141,201 A | 8/1992 | Mizuno et al. | 248/550 |
| 5,285,995 A | 2/1994 | Gonzalez et al. | 248/550 |
| 5,356,110 A * | 10/1994 | Eddy | 108/136 |
| 5,379,980 A * | 1/1995 | Houghton et al. | 248/550 |
| 5,785,341 A * | 7/1998 | Fenton | 267/35 |
| 5,918,862 A * | 7/1999 | Nelson | 267/121 |
| 5,939,639 A | 8/1999 | Lethbridge | 73/724 |
| 5,996,960 A | 12/1999 | Krajec | 248/638 |
| 6,036,162 A | 3/2000 | Hayashi | 248/550 |
| 6,065,741 A * | 5/2000 | Davis et al. | 188/322.19 |
| 6,123,312 A * | 9/2000 | Dai | 188/378 |
| 6,170,622 B1 | 1/2001 | Wakui et al. | 188/378 |
| 6,193,206 B1 | 2/2001 | Yasuda et al. | 248/550 |
| 6,202,492 B1 | 3/2001 | Ohsaki | 73/662 |

* cited by examiner

Primary Examiner—Jack Lavinder
Assistant Examiner—Benjamin A Pezzlo
(74) Attorney, Agent, or Firm—Brian A. Carpenter, Esq.; LeBoeuf, Lamb, Greene & Macrae, L.L.P.

(57) ABSTRACT

A pneumatic isolator for isolating payloads from vibrations consisting of a vertical isolator suspended from pendulum wires. A second downward-facing piston prevents changes in barometric pressure from generating disturbing forces on the isolated payload.

24 Claims, 3 Drawing Sheets

PNEUMATIC ISOLATOR WITH BAROMETRIC INSENSITIVITY

BACKGROUND OF THE INVENTION

1. Field of Invention

An improved pneumatic vibration isolation system which has strong immunity from fluctuations in barometric pressure.

2. Description of the Relevant Art

In many sensitive instrumentation applications it is desirable to isolate a payload from ground vibrations. It is well known to integrate a pneumatic spring with a simple pendulum to isolate from vertical and horizontal ground noise respectively. Pneumatic isolators have an advantage over conventional springs in that they can maintain a payload at a given operating height independent of changes in the payload's weight. The vibration isolation characteristic of such isolators is also largely independent of the payload's weight. Payloads are generally supported by at least three isolators, with four being the most common number. More isolators can be used to support additional weight, with little change on the isolation system's performance. The height of the payload is maintained in such systems by a mechanical or electronic valving system which monitors the payload's height and adjusts the amount of air in each isolator. In this way the isolators can return to the same height with changing or shifting payload weights. Pneumatic isolators are typically of a two-chamber design, where motion of the payload forces air to move through a small orifice or flow restrictor. The resistance to this flow provides vertical damping in the isolators.

In normal pneumatic isolators, changes in barometric pressure generate noise forces on the payload. While the pressure in the isolator acts to supply a force in the upward direction, supporting the payload, barometric pressure acts on the top of a piston and supplies a downward force. This downward force is equal to the piston area times the barometric pressure. An increase or decrease in barometric pressure increases or decreases this downward-acting force on the piston. Since the pressure inside each isolator is constant (they are sealed air chambers), these pressure fluctuations are not seen on the bottom surface of the piston, and the resultant force acts as a source of noise on the payload.

Sources of barometric pressure fluctuations are common. They can be caused by the on-off cycling of HVAC (Heating, Ventilation, and Air Conditioning) systems, opening and closing of doors (which can change the loading on HVAC systems), wind, and changes in atmospheric conditions. These noise sources are distinct from acoustic noise because their low frequency means their acoustic wavelength is much longer than the typical dimensions of a building's room.

The degree of sensitivity is illustrated in the following example: Consider an 800 pound payload supported by isolators which have a 1.5 Hz natural resonant frequency. This means the combined vertical spring constant for the isolators is approximately 180 pounds/inch. Ground noise can vary by a factor of 100 or more, but a 'typical' value at 1 Hz of 0.1 micron or approximately $4 \times 10^{-6}$ inches is assumed. This results in a force on the example payload of $7.1 \times 10^{-4}$ pounds at 1 Hz. If the system consists of four isolators with 4 square inches of area each, then the downward force on the payload due to atmospheric pressure (which we assume is 15 psi) is 240 pounds of force. Thus a 3 ppm (part per million) change in barometric pressure causes a disturbing force to the payload equal to the contribution from ground noise. This pressure change is equivalent to the barometric pressure drop due to a 1.2 inch change in elevation, a very small number.

One environment where noise generated by HVAC systems is particularly severe is in semiconductor manufacturing facilities, where the use of pneumatic isolators is common. In these 'cleanrooms' air is aggressively cycled through ceiling-mounted HEPA filters down through grated floors (also known as sub-floors). Part of cleanroom design is to use positive pressure, so any leaks in the clean room only causes clean air to escape, rather than allow particulate-contaminated air to enter. As a result, whenever a door is opened to the cleanroom, air escapes and the room pressure drops. In such environments, barometric pressure fluctuations can become the dominant source of noise for payloads supported by pneumatic isolators.

The present invention eliminates this source of noise by adding a downward-facing piston to the isolators.

BRIEF SUMMARY OF THE INVENTION

Broadly the invention comprises an isolator which includes a vertical pneumatic isolator assembly and means for grounding the isolator assembly to earth. The assembly has a first pressurized air volume and a piston which vertically supports and isolates a payload. A second pressurized air volume is sealed with a second piston facing in the opposite (downward) direction. The second piston is also coupled to the payload and generates a force which compensates for fluctuations in barometric pressure. A minimum of three such isolators are typically used to support a payload.

Each pneumatic isolator assembly is grounded to earth directly or by a set of supporting wires. When wires are used they prevent the assembly from tilting with horizontal displacements of the payload relative to the earth, while providing a soft suspension for horizontal vibration isolation. There are at least three wires, each being grounded at its top (fastened to earth via a supporting structure) and connected to the pneumatic isolator assembly at its lower end.

The first pressurized air volume in the assembly is contained in an upper pressure vessel which comprises a pressure vessel wall, which wall is common to both the upper pressure vessel and a lower pressure vessel, an upwardly facing (upper) piston which supports the payload, a diaphragm which flexibly secures and seals the piston to the vessel wall, and a sealing bulkhead between the $1^{st}$ and $2^{nd}$ (lower) air chambers. Within this first (upper) pressure vessel are a first pneumatic chamber, which with the piston supports the payload, and a second pneumatic chamber connected to the first pneumatic chamber through a small orifice. As the payload moves in the vertical direction, air is forced to flow between the two chambers through the orifice. This provides a means for damping vertical oscillations of the payload. Fluidic damping (a bob fastened to the piston which moves through a viscous fluid) can also be used to damp motions.

The lower pressure vessel comprises a downward-facing (lower) piston flexibly secured to the vessel wall by a diaphragm. A pressure is applied to the lower pressure vessel such that the pressure differential across the lower diaphragm is enough to shape the diaphragm. This ensures the effective area of the lower piston matches the upper piston. As barometric pressure changes, the change in force on the upper piston is canceled by the (equal and opposite) barometric force acting on the downward-facing lower piston. Here, 'effective piston area' is the area which satisfies the equation (force)=(pressure differential)×(effective area) where the force is the result of an applied pressure differential across the isolator piston.

In general, the downward-facing piston(s) can be located anywhere between the payload and earth, as long as the total area of up-facing and down-facing piston areas are equal. Optimal cancellation occurs when the lower piston acts on the same point as the upper piston. The downward-facing piston preferably acts co-linearly with the upward facing piston, and the pistons are coupled one to the other with either flexible cables or rigid rods.

In the preferred embodiment, the lower pressure vessel is evacuated. This has several advantages over pressurizing the lower pressure vessel. A vacuum generates approximately 15 psi of pressure difference across the diaphragm, which is more than enough to form the diaphragm to shape. Because the pistons work on the compressibility of air, the air-spring constant of the evacuated vessel is zero (there is no air to compress). This allows one to use an absolute minimum volume on the downward-facing piston's air chamber, improving the compactness of the isolator. In addition, the lower pressure vessel also supplies an upward force, and aids in the support of the payload. This reduces the pressure required in the upper upward-facing piston's chamber, and thus reduces the stiffness of its air spring. This pressure compensation is done automatically by the height control valving system. These systems are well known in the art.

In this embodiment, the upper and lower pistons are secured to one another by rigid rods external to the pendulum. To prevent the connecting rods from bending when the payload tilts, a thrust bearing is added to the top supporting surface of the isolator.

In principle, the preferred embodiment has a lower spring constant than a normal pneumatic isolator. In practice, there is a stiffness associated with the rolling rubber diaphragms, and the addition of the second lower diaphragm increases the isolator's stiffness.

To minimize the impact of additional lower diaphragms on a system's stiffness, these diaphragms are made very thin and flexible. This is possible because they only need to support 15 psi of pressure difference, unlike the upper piston which must sustain high pressures (up to 120 psi or more) to support heavy payloads. Typically, an upper diaphragm can have a thickness of 0.6 mm to 1 mm and a lower diaphragm, in this embodiment, a thickness of 0.4 mm or less.

The required vacuum does not have to be extremely good, and can be provided by a simple venturi-type vacuum generator which can run off the same air line which supplies pressure to the height control system. All isolators in a system can share the same vacuum generator, since the isolators are nominally air-tight, and there is no load on the generator.

In an alternate embodiment, the lower pressure vessel is pressurized with enough air to shape the diaphragm. The pressure is set with a simple pressure regulator, which can be shared with all isolators in a system. The pressure must be set low enough so the lower pressure vessel does not significantly increase the overall vertical stiffness of the isolator. To compensate for the downward force introduced by the lower piston, the pressure in the upper pressure vessel must be increased by an amount equal to the pressure in the lower pressure vessel. This compensation is done automatically by the height control valving system.

It is also possible to use downward-facing pistons with different surface areas (evacuated or pressurized). For example, a system consisting of several conventional isolators can have a single downward-facing piston if its area is equal to the sum of the upward-facing piston areas. Likewise, there may be more downward-facing pistons than upward-facing as long as the total area of upward and downward facing pistons is equal. In addition, they must have the same effective center-of-area to prevent pressure fluctuations from inducing tilts on the payload.

Another embodiment uses piston areas of different sizes, but has mechanical linkages (levers) to affect the same force. For example, the downward-facing piston could have one-half the area of the upward-facing piston if it was connected to the payload via a 2:1 lever mechanism. This would produce a force equal to that which would be generated by a full-sized diaphragm.

DESCRIPTION OF THE PREFERRED EMBODIMENT(S)

Figure 1:
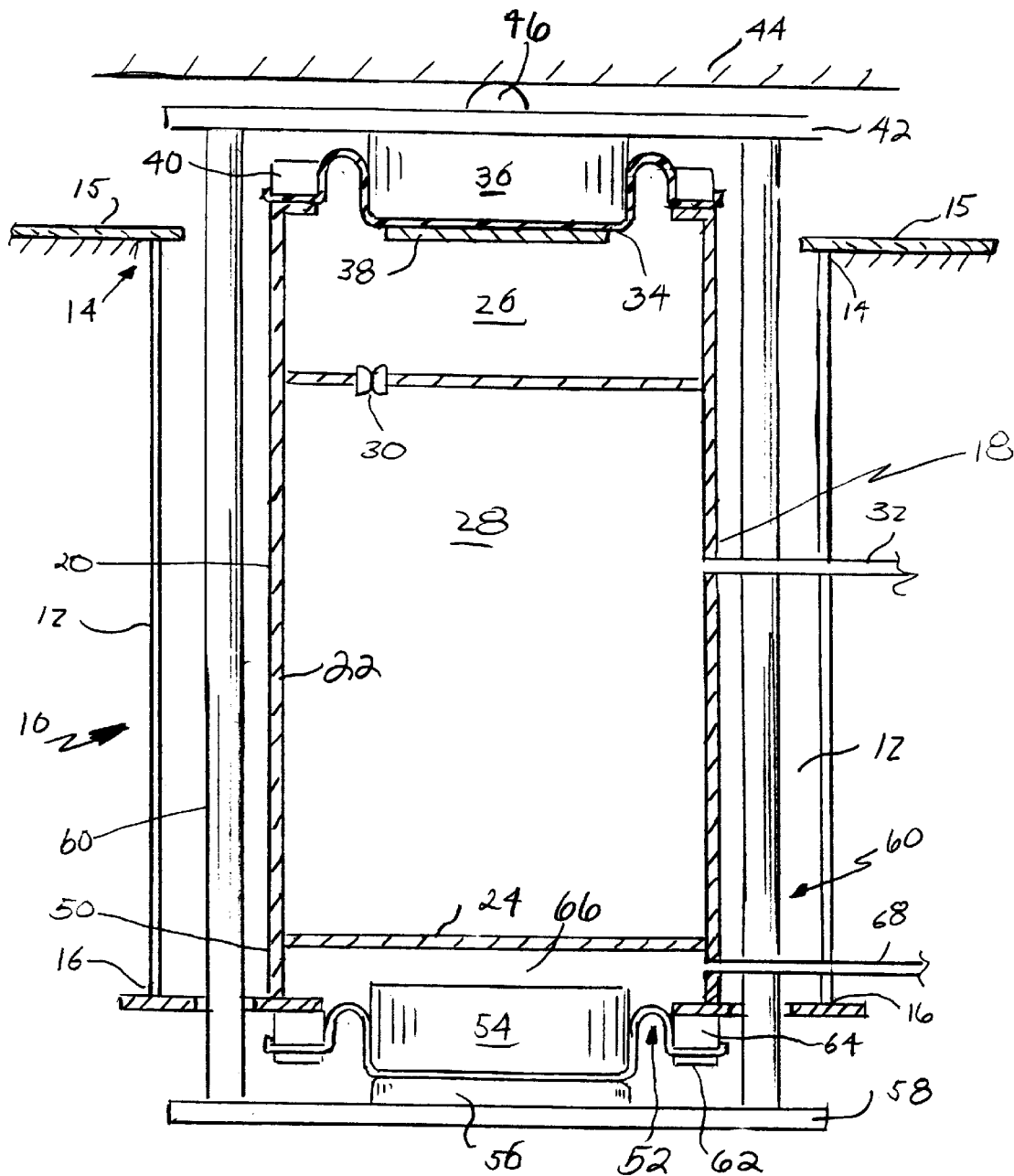
FIG. 1 is a front sectional view of the preferred embodiment of the invention.

Referring to FIG. 1, an isolator is shown generally at 10 and comprises three or more wires 12 (only two shown) each having an upper end 14 and a lower end 16. The lower ends 16 of the wires 12 are flexibly secured to and support a pneumatic isolator assembly 18. The upper ends 14 of the wires 12 are flexibly secured to a structure 15 supported by earth.

The assembly 18 comprises an upper pressure vessel 20 and a lower pressure vessel 50. The pressure vessels 20 and 50 share a common wall 22 and are partitioned by a sealing bulkhead 24.

Inside the upper pressure vessel 20 is a first upper pneumatic chamber 26 and a second lower pneumatic chamber 28 which are connected by a. flow-restricting orifice 30. The flow of air through 30 provides damping in the isolator 10. The control of the pressure is done by a valving system (not shown) connected at 32.

The top of the chamber 26 is sealed by a fabric-reinforced rubber diaphragm 34 which supports an upper piston 36. The diaphragm 34 is secured to the piston 36 by a clamping disk 38, and to the wall 22 by a clamping ring 40. The piston 36 is secured to a load disk 42. A payload 44 is supported by a semispherical bearing 46 which is fastened to the load disk 42 which allows the payload to tilt. When the chamber 26 is pressurized, the payload 44 is lifted, and the assembly 18 functions as a vertical pneumatic vibration isolator.

The lower pressure vessel 50 is separated from the upper pressure vessel 20 by the bulkhead 24. The bottom of the pressure vessel 50 is sealed by a diaphragm 52 which forms around a piston 54. The diaphragm 52 is clamped to the piston 54 by a clamping disk 56. The disk 56 is secured to a lower plate 58 which has rigid rods 60 connecting the plate 58 to the load disk 42. The outer edge of the diaphragm 52 is fastened to the wall 22 by a clamping ring 62, and is kept in proper shape by a ring 64. The wall 22, the bulkhead 24, the diaphragm 52 and the piston 54 define an air chamber 66. The rods 60 transfer the upward force generated by barometric pressure acting on the piston 54 to the payload 44 through the disk 42. The equal and opposite-facing areas of pistons 36 and 54 effectively cancel any fluctuations in barometric pressure. The air chamber 66 is evacuated by a vacuum generator (not shown) connected to the port 68.

Figure 2:
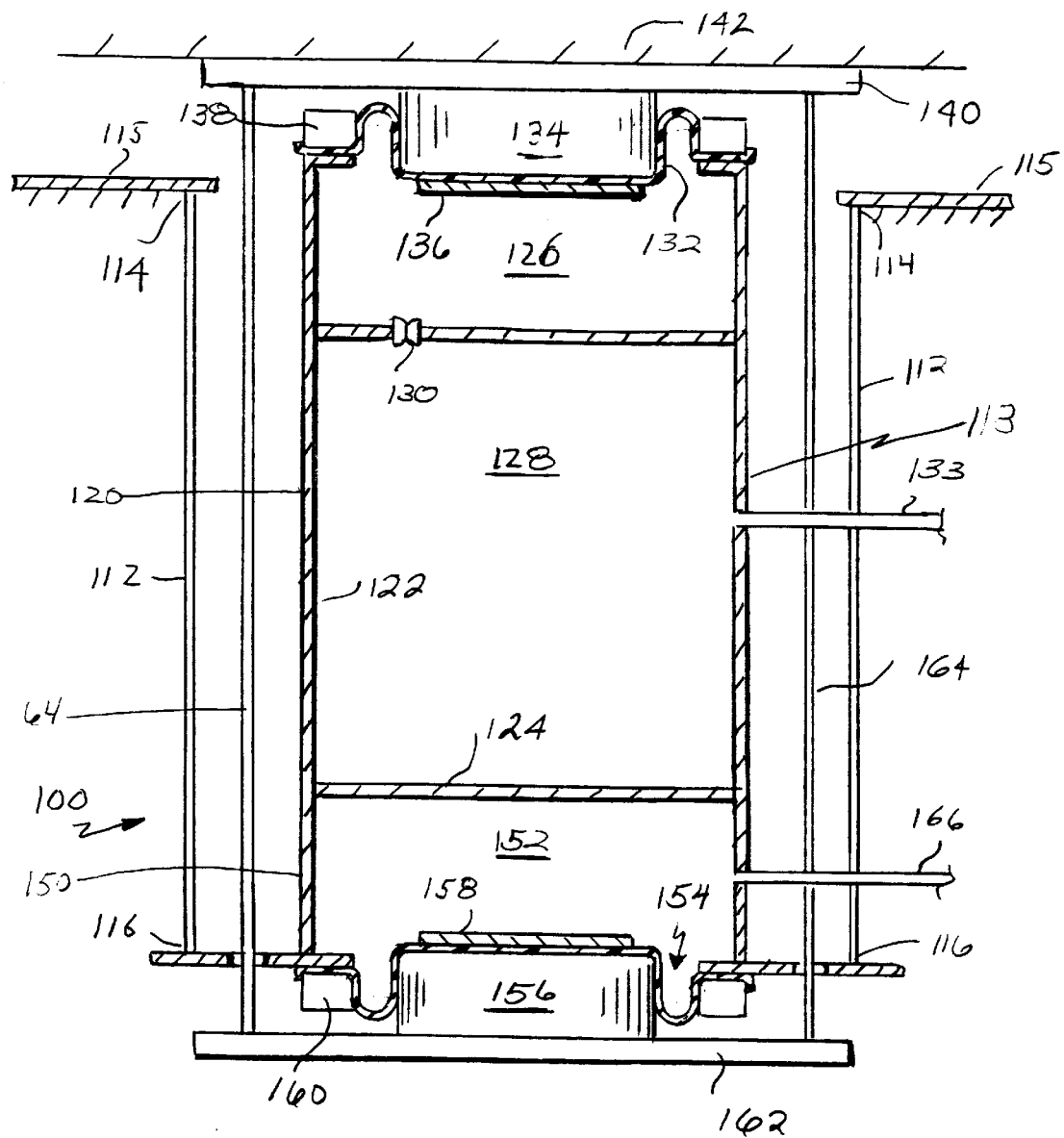
FIG. 2 is a front sectional view of an alternative embodiment of the invention.

FIG. 2 shows an alternate embodiment of the invention and an isolator is generally shown at 100 and comprises three or more wires 112 (only two shown) each having an upper end 114 and a lower end 116. The lower ends 116 of the wires 112 are flexibly secured to and support an pneumatic isolator assembly 118 which comprises an upper pressure vessel 120 and a lower pressure vessel 150. The pressure vessels 120 and 150 share a common wall 122 and are partitioned by a sealing bulkhead 124.

The upper ends 114 of the wires 112 are flexibly secured to a structure 115 supported by earth. Inside of the pressure vessel 120 is a first pneumatic chamber 126 and a second pneumatic chamber 128 which are connected by a flow-restricting orifice 130. The flow of air through 130 provides vertical damping in the isolator. The control of the pressure is done by a valving system (not shown) connected at 133.

The top of the upper chamber 126 is sealed by a fabric-reinforced rubber diaphragm 132 which supports an upper piston 134. It is secured to the piston 134 by a clamping disk 136, and to the wall 122 by a clamping ring 138. The piston 134 is secured to a load disk 140. A payload 142 is supported by the load disk 140. When the chamber 126 is pressurized, the payload 142 is lifted, and the assembly 118 functions as a vertical pneumatic vibration isolator.

The lower pressure vessel 150 comprises an air chamber 152 which is separated from the upper pressure vessel 120 by the sealing bulkhead 124. The bottom of the chamber 152 is sealed by a diaphragm 154 which forms around a lower piston 156. The diaphragm 154 is clamped to the piston 156 by a disk 158. The outer edge of the diaphragm 154 is fastened to the wall 122 by a clamping ring 160. The piston 156 is secured to a lower plate 162 which has flexible cables 164 connecting the plate 162 to the load disk 140. The flexible nature of the cables 164 allows the payload 142 to tilt without restriction. The cables 164 transfer the downward force generated by the pressure in the lower chamber 152 acting on the piston 156 to the payload 142. The equal and opposite-facing areas of pistons 134 and 156 effectively cancel any fluctuations in barometric pressure. The air chamber 152 is pressurized by a pressure regulator (not shown) connected to a port 166.

Figure 3:
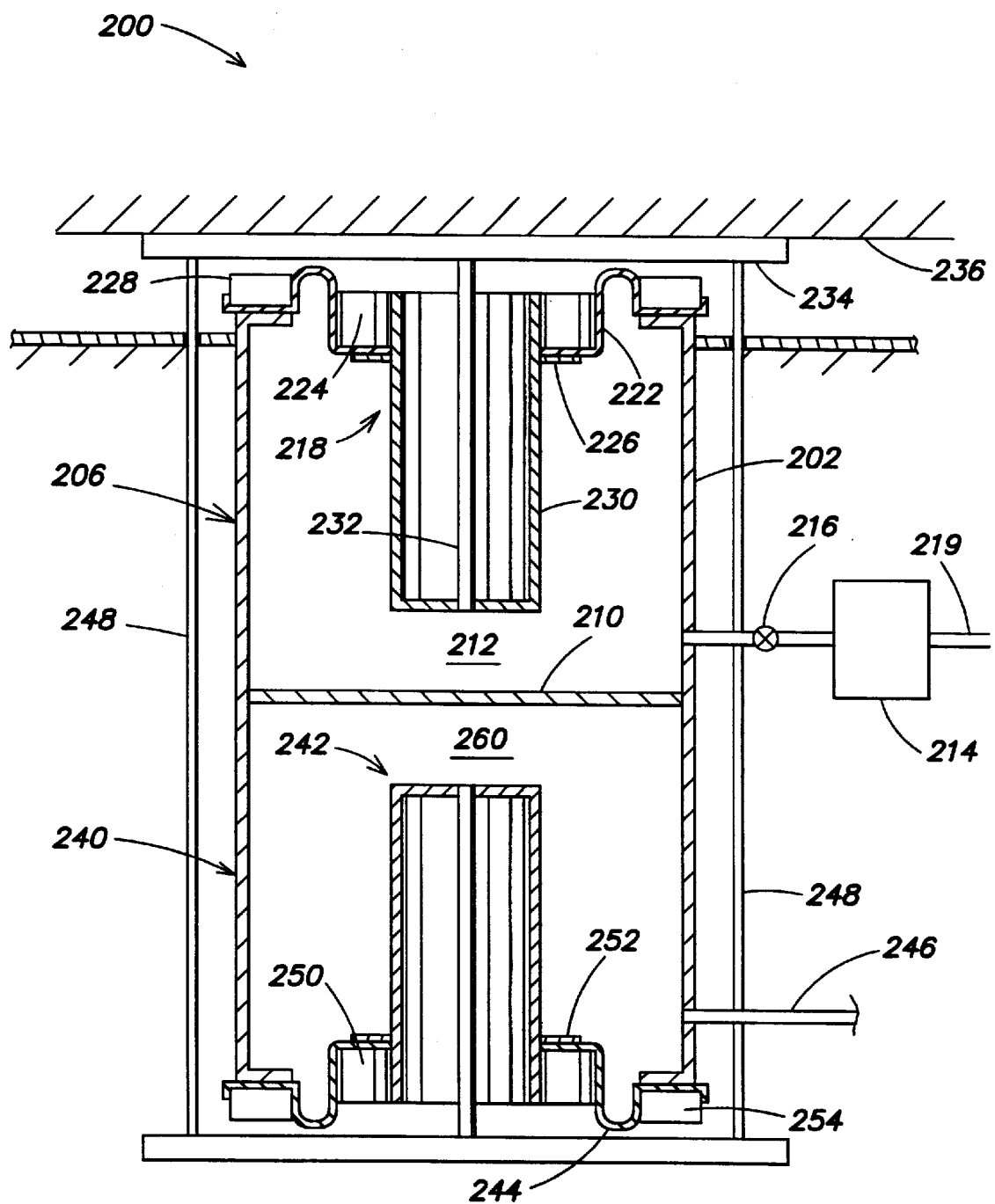
FIG. 3 is a front sectional view of another alternative embodiment of the invention.

FIG. 3 shows another alternative embodiment of the invention and a vertical pneumatic isolator assembly is shown generally at 200. The assembly 200 has a wall 202 which is rigidly secured to earth. The assembly 200 comprises an upper pressure vessel 206 and a lower pressure vessel 240. The pressure vessels 206 and 240 have in common the wall 202 and are partitioned by a sealing bulkhead 210.

The upper pressure vessel 206 has a pneumatic chamber 212. A source air chamber 214 (not to scale) is connected to the chamber 212 through an orifice 216. The flow of air through orifice 216 provides vertical damping in the isolator assembly 200. The control of the pressure is done by a valving system (not shown) connected to 219. When the chamber 212 is pressurized, a load plate 234 lifts a payload 236 and the assembly functions as a vertical pneumatic vibration isolator.

A gimbal piston assembly 218 is received in the chamber 212 and the top of the chamber 212 is sealed by a fabric-reinforced rubber diaphragm 222 which supports an upper ring-like piston 224. The piston 224 is secured to the diaphragm 222 by a ring-like clamp 226 and to the pressure vessel 206 by a clamping ring 228. A piston well 230 depends from the piston 224. A support rod 232 is supported on and pivots on the floor of the well 230. The rod 232 supports a load plate 234. The well 230 acts like a pendulum, and provides horizontal vibration isolation when the system is inflated.

The pressure vessel 240 is dimensionally the same as the upper pressure vessel 206 and has a pneumatic chamber 260. A gimbal piston assembly 242 is received in the chamber 260 and the bottom of the chamber is sealed by a diaphragm 244 which supports a lower ring-like piston 250. The piston 250 is secured to the diaphragm 244 by a ring-like clamp 252 and to the pressure vessel 240 by a clamping ring 254. The equal and opposite-facing areas of the piston assemblies 218 and 242 effectively cancel any fluctuations in barometric pressure. The chamber 218 is pressurized through the port 246 by a pressure regulator set with enough pressure to form the diaphragm 244. Rods 248 transfer the downward force generated by the piston assembly 242 to the load disk 234.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention what I now claim is:

1. A pneumatic isolator which comprises:
   at least one pressure vessel which functions as a pneumatic isolator which vertically supports and isolates a payload from vertical vibration;
   means for pressurizing the pressure vessel; and
   means for canceling the effects of barometric pressure on the isolator.

2. The isolator of claim 1:
   wherein the at least one pressure vessel includes a first piston which is secured to the pressure vessel by a flexible diaphragm; and
   the means for canceling comprises a second piston having an effective surface area equal to the first piston.

3. The isolator of claim 2 which comprises a second pressure vessel and the second piston is secured to the second pressure vessel by a flexible diaphragm.

4. The isolator of claim 3 which comprises:
   means to secure the first and second pistons one to the other.

5. The isolator of claim 4 which comprises:
   means for maintaining the second pressure vessel chamber under vacuum.

6. The isolator of claim 5 wherein the means to secure the first and second pistons comprises rigid rods.

7. The isolator of claim 6 wherein the first piston has a load surface and a thrust bearing is positioned on the load surface.

8. The isolator of claim 3 which comprises:
   means for maintaining a positive pressure in the second pressure vessel.

9. The isolator of claim 8 wherein the means to secure the first and second pistons comprises flexible rods or cables.

10. The isolator of claim 4 wherein the first and second pressure vessels include gimbal piston assemblies, a first gimbal piston assembly being received in the first pressure vessel and the second gimbal piston assembly being received in the second pressure vessel, each gimbal piston assembly comprised of:

a depending well having a floor; and an elongated support member having a first end attached to the floor of the depending well and a second end attached to a load plate.

11. A compensator for use with a vibration isolation system, the vibration isolation system having at least one gas actuator including a diaphragm and a piston applying an upward force on a payload platform in an environment having a barometric pressure subject to changes, the diaphragm and piston having an effective area, wherein an increase in the barometric pressure acting on the effective area of the gas actuator results in a downward force on the payload platform, and wherein a decrease in the barometric pressure acting on the effective area of the gas actuator results in an upward force on the payload platform, the compensator compensating for the effects of changes in the barometric pressure on the gas actuator, the compensator comprising:

a compensating gas actuator including a diaphragm and a piston, the diaphragm and piston having an effective area exposed to the barometric pressure, the effective area of the compensating gas actuator being equal to the effective area of the gas actuator, and means for transferring the force generated by the barometric pressure acting on the effective area of the compensating gas actuator to the payload platform in a direction opposite the direction of the force due to barometric pressure acting on the effective area of the gas actuator thereby tending to cancel the effects of changes in barometric pressure on the gas actuator.

12. The compensator of claim 11, wherein the means for transferring the force includes a rod connected to the piston.

13. The compensator of claim 11, wherein the means for transferring the force includes a cable and at least one pulley, the cable being connected to the piston.

14. The compensator of claim 11, wherein the compensating gas actuator has an internal pressure lower than the barometric pressure.

15. A compensator for use with a vibration isolation system, the vibration isolation system having at least one gas actuator including a diaphragm and a piston applying an upward force on a payload platform in an environment having a barometric pressure, the diaphragm and piston having an effective area, wherein an increase in the barometric pressure acting on the effective area of the gas actuator results in a downward force on the payload platform, and wherein a decrease in the barometric pressure acting on the effective area of the gas actuator results in an upward force on the payload platform, the compensator compensating for the effects of changes in the barometric pressure on the gas actuator, the compensator comprising:

a compensating gas actuator including a diaphragm and a piston, the diaphragm and piston having an effective area exposed to the barometric pressure, the effective area of the compensating gas actuator being substantially equal to the effective area of the gas actuator; and a mechanical linkage connected to the piston, the mechanical linkage when connected to the payload platform transferring the force generated by the barometric pressure acting on the effective area of the compensating gas actuator to the payload platform in a direction opposite the direction of the force due to barometric pressure acting on the effective area of the gas actuator thereby tending to cancel the effects of changes in the barometric pressure on the gas actuator.

16. A compensator for use with a vibration isolation system, the vibration isolation system having one or more gas actuators, each gas actuator of the vibration isolation system including a diaphragm and a piston applying an upward force on a payload platform in an environment having a barometric pressure, the diaphragm and piston having an effective area, wherein an increase in the barometric pressure acting on the effective area of the gas actuator results in a downward force on the payload platform, and wherein a decrease in the barometric pressure acting on the effective area of the gas actuator results in an upward force on the payload platform, the compensator compensating for the effects of changes in the barometric pressure on the one or more gas actuators, the compensator comprising:

one or more compensating gas actuators, each compensating gas actuator including a piston and a diaphragm, the piston and diaphragm having an effective area exposed to the barometric pressure; and means for transferring the force generated by the barometric pressure acting on the effective area of each of the one or more compensating gas actuators to the payload platform in a direction substantially normal to the payload platform and in opposition to the force on the payload platform due to the increase or decrease in the barometric pressure thereby substantially cancelling the effects of the increase or decrease in the barometric pressure on the one or more gas actuators.

17. The compensator of claim 16, wherein the total effective area of the one or more compensating gas actuators is substantially the same as the total effective area of the one or more gas actuators.

18. The compensator of claim 17, wherein the means for transferring includes a rod connected to the piston of each of the one or more compensating gas actuators.

19. The compensator of claim 16, wherein the total effective area of the one or more compensating gas actuators is different than the effective surface area of the at least one gas actuator, and the compensator further includes a mechanical linkage connected to the one or more pistons to connect the one or more pistons to the payload platform, the mechanical linkage providing a mechanical advantage such that the force applied to the payload platform is equal and opposite the force due to the increase or decrease in the barometric pressure acting on the effective area of the at least one gas actuator.

20. The compensator of claim 19, wherein the means for transferring the force includes at least two pulleys and a cable to provide the mechanical advantage.

21. A compensator for use with a vibration isolation system, the vibration isolation system having one or more gas actuators, each gas actuator of the vibration isolation system including a diaphragm and a piston applying an upward force on a payload platform in an environment having a barometric pressure subject to changes, the diaphragm and piston having an effective area, wherein an increase in the barometric pressure acting on the effective area of the gas actuator results in a downward force on the payload platform, and wherein a decrease in the barometric pressure acting on the effective area of the gas actuator results in an upward force on the payload platform, the compensator compensating for the effects of changes in the barometric pressure on the one or more gas actuators, the compensator comprising:

one or more compensating gas actuators, each compensating gas actuator including a piston and a diaphragm, the piston and diaphragm having an effective area exposed to the barometric pressure, each piston of the one or more compensating gas actuators being adaptable for coupling to the payload platform such that the force due to the barometric pressure acting on the effective area of each compensating gas actuator is transferred to the payload platform in a direction substantially normal to the payload platform and in opposition to the force due to the increase or decrease in the barometric pressure on the one or more gas actuators thereby tending to cancel the effects of changes in the barometric pressure on the one or more gas actuators.

22. A compensator for use with a vibration isolation system, the vibration isolation system having a gas actuator supporting a payload platform in an environment with a floor and barometric pressure, the gas actuator having a diaphragm and a piston with a side facing the payload platform and exposed to the barometric pressure, the diaphragm and piston having an effective area, the barometric pressure susceptible to changes, the compensator comprising:

gas actuator including a piston connected to a body by a diaphragm to form a chamber, the diaphragm and piston separating the chamber from the barometric pressure, the piston moving in a direction substantially normal to the payload platform, the piston having a side facing the floor, the diaphragm and piston having an effective area substantially equal to the effective area of the gas actuator; and a rod connected to the piston and adaptable for connecting to the payload platform, the rod, when connected to the payload platform, transferring the force exerted on the piston by the barometric pressure to the payload platform in a direction substantially normal to the payload platform thereby cancelling the effects of changes in the barometric pressure on the gas actuator of the vibration isolation system.

23. A gas vibration isolator assembly to isolate a payload from vibrations in an environment having barometric pressure, the barometric pressure subject to fluctuations, the gas vibration isolator assembly being insensitive to fluctuations in the barometric pressure, the gas vibration isolator assembly comprising:

a body having a first chamber and a second chamber, each chamber located substantially symmetrical along an axis;

a gas actuator, the gas actuator including a piston attached to the body by a diaphragm to cover and seal the first chamber for containing a gas under pressure, the piston having a side exposed to the barometric pressure, the piston and diaphragm having an effective area, the piston being free to move in a direction substantially parallel to the axis;

a compensating gas actuator including a piston attached to the body by a diaphragm to cover and seal the second chamber, the piston being free to move in a direction substantially parallel to the axis, the piston having a side exposed to the barometric pressure, the piston and diaphragm having an effective area substantially equal to the effective area of the gas actuator, the piston of the compensating gas actuator oriented such that the force on the piston due to barometric pressure is opposite the direction of the force on the piston of the gas actuator due to barometric pressure; and a load disk supported by the piston of the gas actuator and mechanically connected to the piston of the compensating gas actuator such that a change in the barometric pressure acts on the piston of the compensating gas actuator to cause an equal and opposite force to be applied to the load disk thereby cancelling the force applied by the gas actuator to the load disk due to the change in barometric pressure.

24. A vibration isolation system to isolate a payload from vibrations in an environment having a floor and barometric pressure, the vibration isolation system isolating the payload from vibrations in a direction substantially normal to the floor, the vibration isolation system being insensitive to fluctuations in the barometric pressure, the vibration isolation system comprising:

a payload platform;

a frame with at least one point of support for supporting the frame on the floor;

at least one gas actuator supporting the payload platform, the gas actuator including a piston attached to a body by a diaphragm to define a sealed chamber for containing a gas under pressure, the piston with a first side facing the payload platform, the first side being exposed to the barometric pressure, the piston being free to move in a direction substantially normal to the payload platform, the body of the at least one gas actuator being attached to the frame, the piston supporting the payload platform;

at least one compensating gas actuator including a piston connected to a body by a diaphragm, the piston being free to move, the piston having a side exposed to barometric pressure, the body being connected to the frame; and means for transferring the force generated by barometric pressure acting on the piston of the at least one compensating gas actuator to the payload platform in a direction substantially normal to the payload platform and opposite the direction of the force due to the barometric pressure acting on the piston of the at least one gas actuator.

* * * * *